United States Patent [19]

Koga et al.

[11] Patent Number: 5,388,167

[45] Date of Patent: Feb. 7, 1995

[54] DOCUMENT IMAGE PROCESSING SYSTEM AND DOCUMENT IMAGE PROCESSING METHOD

[75] Inventors: Masashi Koga, Kokubunji; Hiroshi Sakou, Shiki; Masaaki Fujinawa, Odawara; Hiromichi Fujisawa, Tokorozawa; Tatsuya Murakami, Tachikawa; Yoshihiro Shima, Tokorozawa; Tsugio Takahashi, Hadano; Kazunori Kinoshita, Odawara; Kiyomichi Kurino, Ashigarashimo; Hidefumi Masuzaki, Hadano, all of Japan

[73] Assignee: Hitachi, Ltd., Tokyo, Japan

[21] Appl. No.: 850,303

[22] Filed: Mar. 12, 1992

[30] Foreign Application Priority Data

Mar. 12, 1991 [JP] Japan ................................ 3-046409

[51] Int. Cl.$^6$ ................................................ G06K 9/38
[52] U.S. Cl. ................................ 382/50; 258/461; 382/61
[58] Field of Search ................ 382/61, 50, 22, 56, 382/51, 52, 53; 358/455, 456, 457, 461, 465, 466

[56] References Cited

U.S. PATENT DOCUMENTS

| | | | |
|---|---|---|---|
| 3,872,434 | 3/1975 | Duvall et al. | 382/50 |
| 4,314,281 | 2/1982 | Wiggins et al. | 382/50 |
| 4,366,507 | 12/1982 | Mori | 382/50 |
| 4,542,378 | 9/1985 | Suganuma et al. | 382/61 |
| 4,675,909 | 6/1987 | Egami et al. | 382/50 |
| 4,783,836 | 11/1988 | Takashima | 382/50 |
| 4,975,786 | 12/1990 | Katayama et al. | 382/50 |
| 5,056,154 | 10/1991 | Aono et al. | 382/56 |
| 5,086,484 | 2/1992 | Katayama et al. | 382/52 |
| 5,091,782 | 2/1992 | Krause et al. | 382/56 |
| 5,099,340 | 3/1992 | Kamada et al. | 382/56 |
| 5,121,447 | 6/1992 | Tanioka et al. | 382/50 |
| 5,140,650 | 8/1992 | Casey et al. | 382/61 |
| 5,153,925 | 10/1992 | Tanioka et al. | 382/50 |

FOREIGN PATENT DOCUMENTS 56-2073 1/1981 Japan.

OTHER PUBLICATIONS

Minami and Nakamura, Image Engineering, Corona, Colo., pp. 144–175.
Haralick et al, "Texture Features for Image Classification", IEEE Transactions on Systems Man and Cybernetics, vol. SMC-3, No. 6, Nov. 1973, pp. 610–621.
R. Nevatia, Image Recognition and Image Comprehension for Artificial Intelligence–Computer Vision, Keigakusyuppan, Co., pp. 166–167.
Azeriel Rosenfeld and Avinash C. Kak, Digital Picture Processing, Academic press, Inc., pp. 185–204, and 285-292 (Japanese translation).
Yasui and Nakajima, Basis of Image Engineering, Syokabo, Co., pp. 29–36.
Mori and Itakura, Basis of Image Recognition [II], Ohm, Co., pp. 103–110.
Minami and Nakamura, Image Engineering, Corona, Co., pp. 73–78.

Primary Examiner—Joseph Mancuso
Attorney, Agent, or Firm—Fay, Sharpe, Beall, Fagan, Minnich & McKee

[57] ABSTRACT

A file document image input can have shading removed to produce a deshaded image that is useful for highly efficient compression encoding, to be thereafter stored and transmitted in such efficient encoded form. When the image is retrieved or received, the decoded and deshaded image may have shading returned to it by combining with a shaded template image stored in the template image memory or by synthesizing shading in specified regions. By removing shading from regions, optical character recognition, shading identification or other processing such as smear prevention can be enhanced.

4 Claims, 13 Drawing Sheets

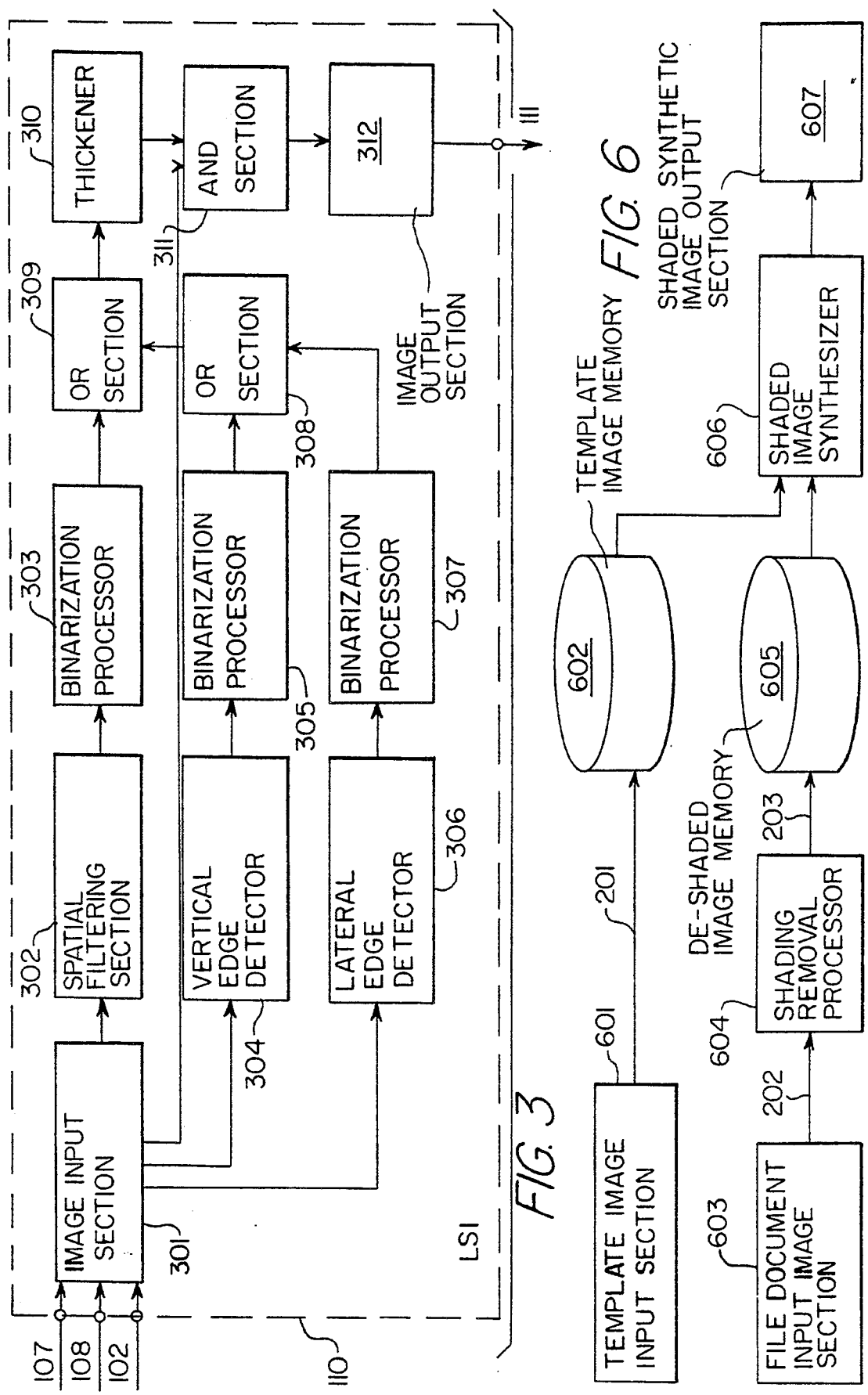

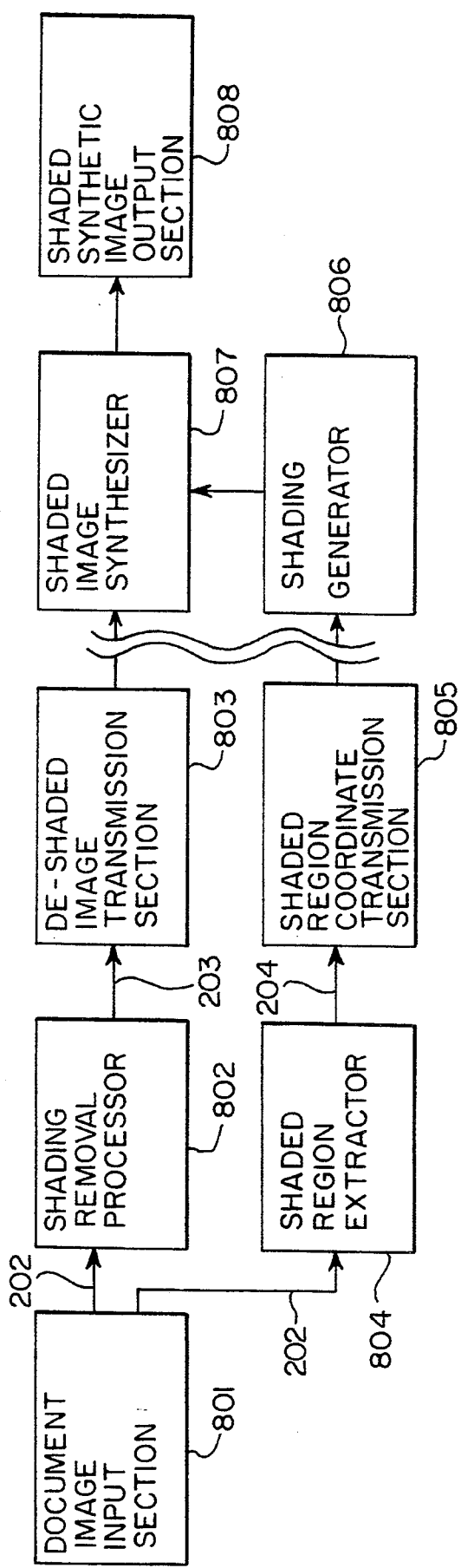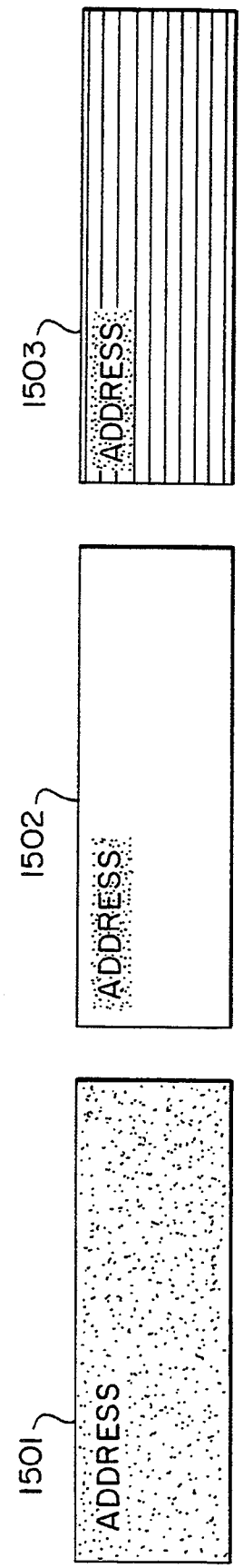
FIG. 8
FIG. 15A
FIG. 15B
FIG. 15C

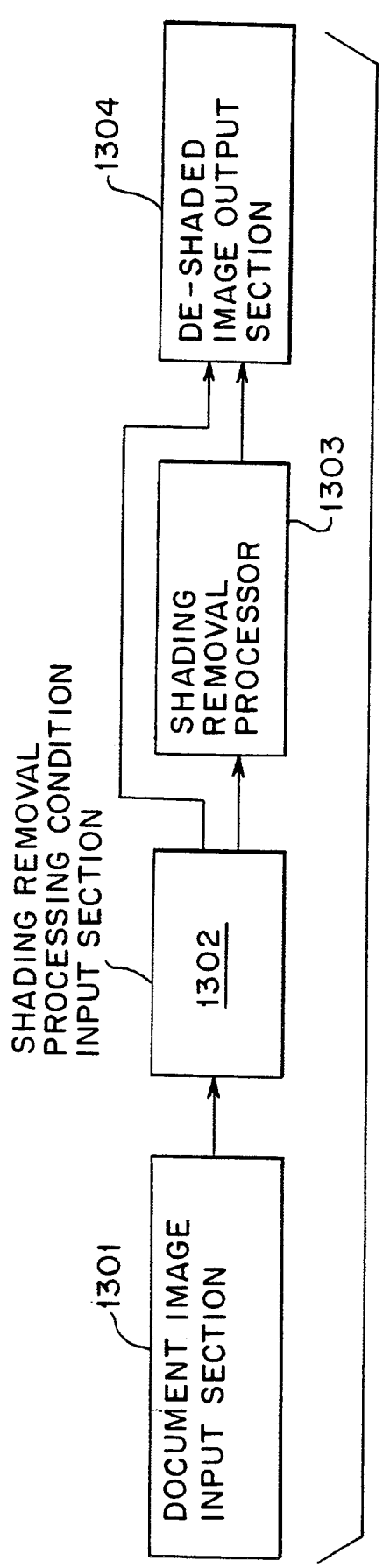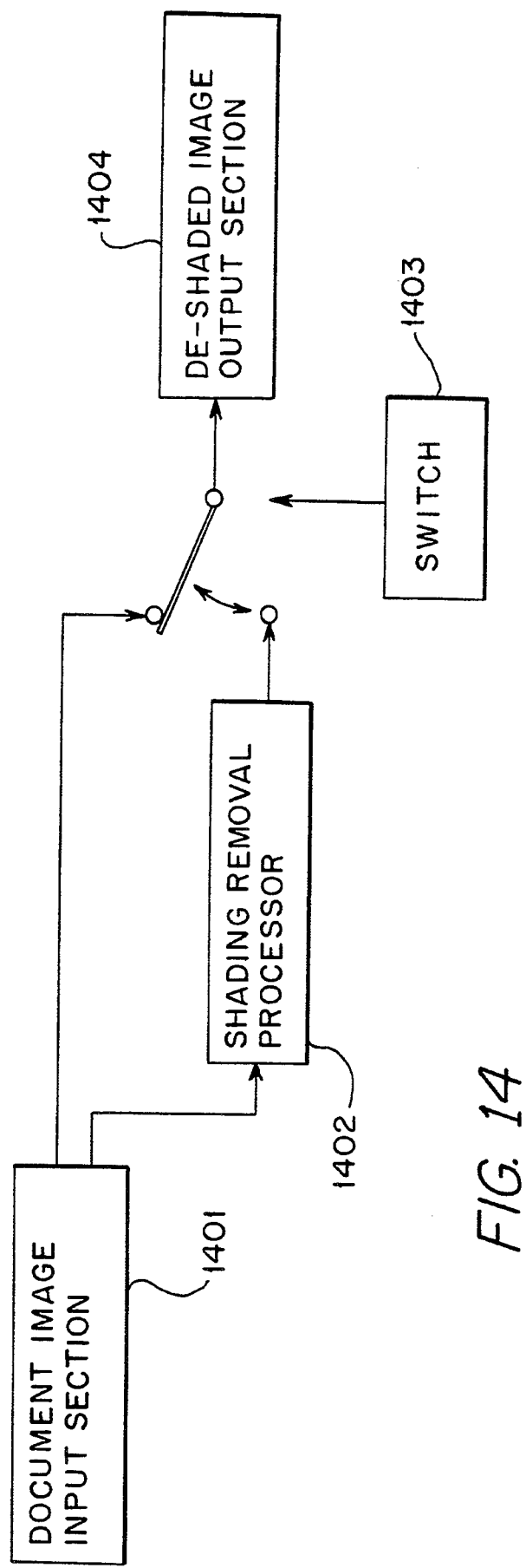
FIG. 13
FIG. 14

DOCUMENT IMAGE PROCESSING SYSTEM AND DOCUMENT IMAGE PROCESSING METHOD

BACKGROUND OF THE INVENTION

The present invention relates to document image identifying, processing, storing, transmitting and receiving, particularly documents such as vouchers, completed forms and the like that have standardized formatting, including shading, with modifications.

In document filing systems used in practical applications at the present time, the document to be stored is first scanned, then the scanned image is digitized by binarization processing or dither processing. The digital image thus produced is compressed using a modified Hoffman encoding (MH) modified read encoding (MMR) or the like, and then the compressed digital image is stored, for example on an optical disk or other recording medium.

Optical character readers now in practical use binarize the image by a scanner then subject the thus produced image to character recognition. Apparatus of this type are not capable of recognizing character patterns printed over shading. For enabling characters to be read over shading by currently available optical character readers, color of the dots used in the shading is limited to a specific drop-out color and only the drop-out color portions are eliminated prior to optical character recognition. That is, the shading is limited to only a specific color that can be dropped out by filtering or the like, which color is not used to produce the characters. For example, such technology is disclosed in Japanese unexamined patent publication 56(1981)-2073. More specifically, the shading may be green or red to be removed by an optical filter such as a green or red glass, so that the characters that are not green or red may then be subjected to optical character recognition.

SUMMARY OF THE INVENTION

It is an object of the present invention to increase compression efficiency, for example in the storage, transmission and processing of shaded documents.

The MH encoding and MMR encoding that are currently in use for compressing digital images in facsimile and document filing systems, employ a compression of the image by encoding the run length of the pixel series in the image. When an image obtained by scanning a document having shading is digitized simply by binarization or dither processing, however, the transition back and forth between black and white dots is very frequent, that is the run length is short. As a result, the compression efficiency is low.

The run length can be particularly short because not only is each dot a varying black density, but many times the dots change size, for example in newspaper print. Each change, whether black to white, white to black, from one shade of black to another shade of black or one size dot to another size dot, stops the run length thereby reduces the efficiency of compression.

The discrete cosine transform method used for compression of multivalue (also meaning multibit herein) images, for example as shown in Minami and Nakamura, *Image Engineering*, Corona Co., pages 144–175, also exhibits low compression efficiency with respect to images that include many patterns, for example dotted patterns, and patterns that have a high spatial frequency. Therefore, the cost of storing documents in the above mentioned prior art document filing systems and the cost of transmitting the images by facsimile or the like is correspondingly high. Thus, it is the first object of the present invention to improve the compression efficiency as compared to the above analyzed prior art techniques.

The second object of the present invention is to enable recognition of characters that are written over shading. Current optical character readers are unable to recognize character patterns that are overlaid on shading of a color other than a specific drop-out color. It is therefore necessary to provide a first scanner in the document filing system for documents that are to be stored together with their shading and to provide a second different type of scanner in the system when optical character recognition is required. This makes it difficult to realize an integrated document system.

The present invention achieves high compression efficiency in compressing the image of a document having shading by removing the shading from the image prior to compression. That is, the shading is removed from the input image to provide a deshaded image and thereafter it is the deshaded image that is compressed.

The present invention further removes the shading from an image to produce a deshaded image and thereafter it is the deshaded image that is subjected to optical character recognition.

Removal of the shading from a shaded digital image reduces the number of runs in the image during compression and thus increases the efficiency at which an image can be compressed by MH encoding, MMR encoding, or the like. In the case of a multivalue image with shading, removal of the shading reduces the band width of the high frequency component and thus enhances the efficiency at which the image can be compressed by the discrete cosine transform method.

The shading pattern can be removed even when a document is input with shading of a color other than the drop-out color. Even with a digital image having the drop-out color, removal of the shading with the present invention is useful, because the same apparatus or method may be used for all colors whether they are drop-out colors or not. As a result, when the resulting deshaded image is input to an optical character reader, character patterns that were overlaid on any type of shading can be recognized.

BRIEF DESCRIPTION OF THE DRAWING

Further objects, features and advantages of the present invention will become more clear from the following detailed description of a preferred embodiment, with variations, modifications and further embodiments, all as set forth in the following description of the accompanying drawings, when:

FIG. 3 is a block diagram of a shading removal processor on a single integrated chip, as a component of the system of FIG. 1;

FIGS. 4A–4C show charts useful in explaining the procedures in a specific shading removal process according to the present invention;

FIG. 6 is a block diagram of a portion of the apparatus shown in FIG. 1 to produce a simplified document filing system, that is a subcombination of FIG. 1;

FIG. 8 shows additional features of the embodiment of FIG. 1 providing for the transmission and reception of an image, according to the present invention;

FIG. 13 is a block diagram of a document image processing system as a subcombination of the present invention;

FIG. 14 is a block diagram of a subcombination of the present invention, showing specific details of the shading removal processing bypass;

FIGS. 15A thru 15C are diagrams showing the modification of the image during the shading removal according to the present invention;

DETAILED DESCRIPTION

The preferred embodiment of the present invention will be described with respect to the individual figures showing various portions of the overall process and varying degrees of detailing, with modifications.

The embodiment of the present invention is an integrated document image processing system for high-efficiency storage, transmission, processing, retrieval and output of document images prepared on standard forms having shading.

Figure 1:
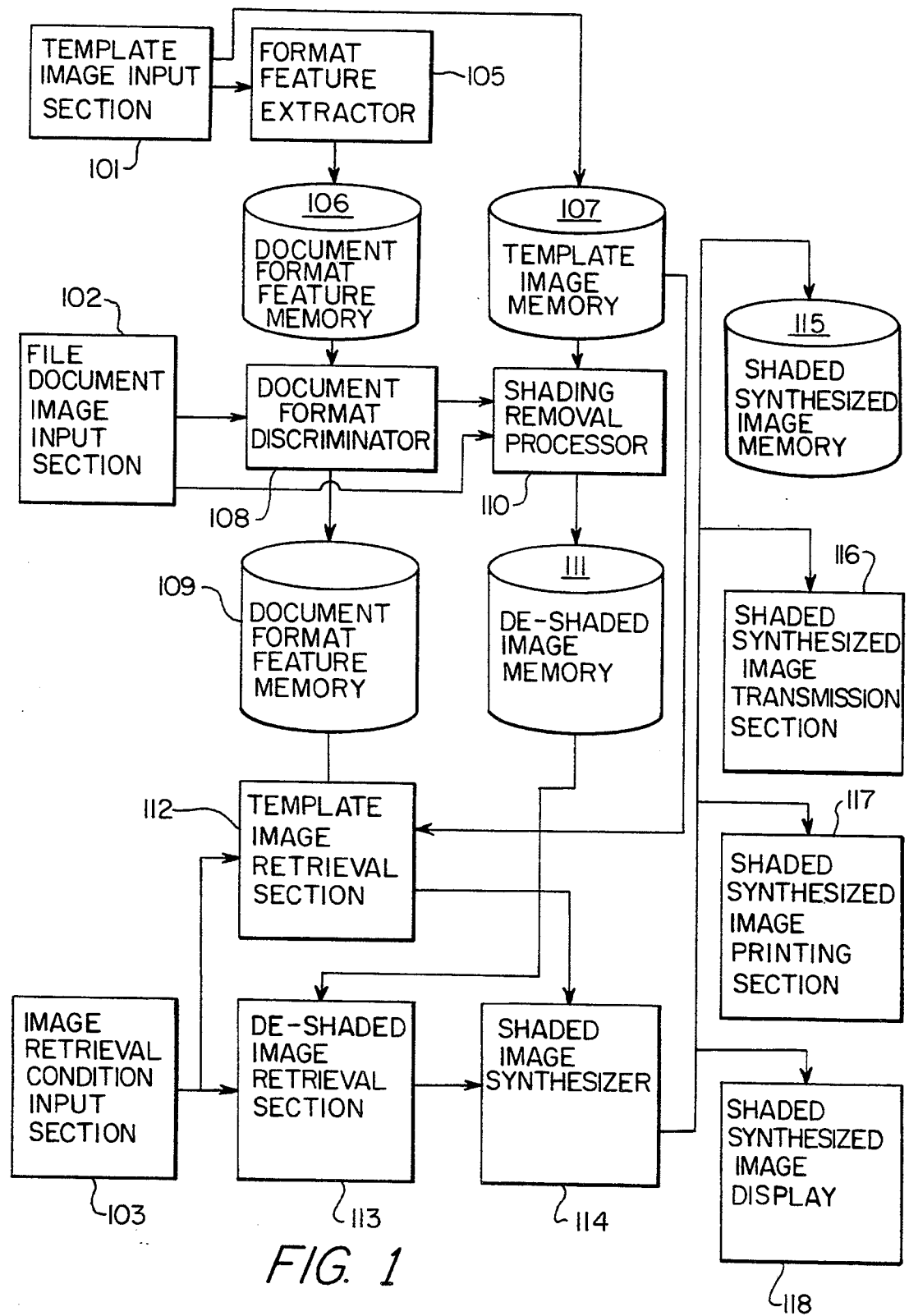
FIG. 1 is a block diagram of a document processing system according to an embodiment of the present invention.

With reference to FIG. 1, a template image 201 that is shown in FIG. 2 as a standard document having shading is input via a template image input section 101. The template image input section 101 is an image input device, for example a conventional scanner, for reading documents and outputting corresponding digital images. A "template image" is an image of a blank standard document, for example, a voucher or other document used by a bank, government office, a private company, or the like. The template image 201 from the template image input section 101 is input to a format feature extractor 105. The format feature extractor 105 automatically extracts, from the template image 201, features such as the border(s) and similar features for identifying the format of the template image, such as a document form; that is, features are extracted that identify the particular template image 201 and distinguish it from other template images. The format feature of the document that was extracted by the format feature extractor 105 is then stored in a document format feature memory 106, along with other different format features corresponding to other different template images. The template image 201 that corresponds to the extracted format features is stored in a template image memory 107 at a memory location correlated to the memory location of its format feature stored in the document format feature memory 106, for subsequent retrieval according to the corresponding format feature.

Figure 2A:
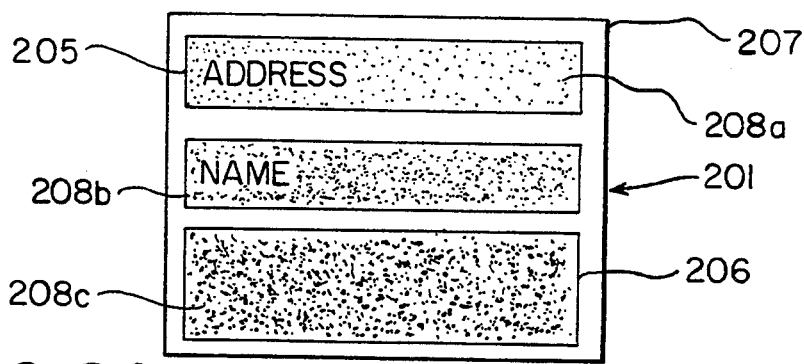
FIGS. 2A thru 2D show the progression of images input and produced by the present invention according to operation of the embodiment of FIG. 1.
Figure 2B:
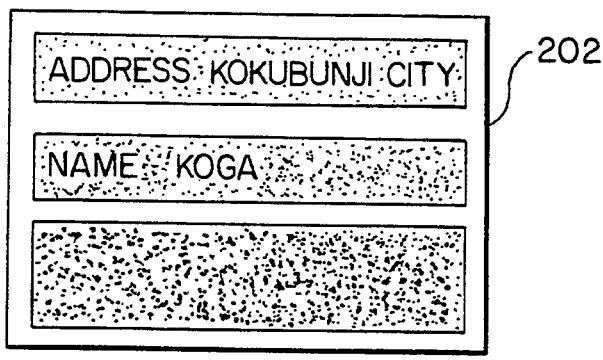

The image of the document to be filed, that is the file document image 202 shown in FIG. 2B, is input as a digital image via a file document image input section 102, which is a kind of image input device, for example a conventional scanner. The "file document image" 202 is a digital image of a document form consisting of the standard document "template image" 201 additionally having a modification, such as handwriting, graphics, typing or the like added thereon. The file document image 202 is sent to a document format discriminator 108. The document format discriminator 108 identifies the format of the file document image by analyzing the file document image with reference to format feature information stored in the document format feature memory 106. The format of the document, which is the result of the document format identification in the document format discriminator 108, is forwarded to a document format feature memory 109 for storage therein.

Figure 2C:
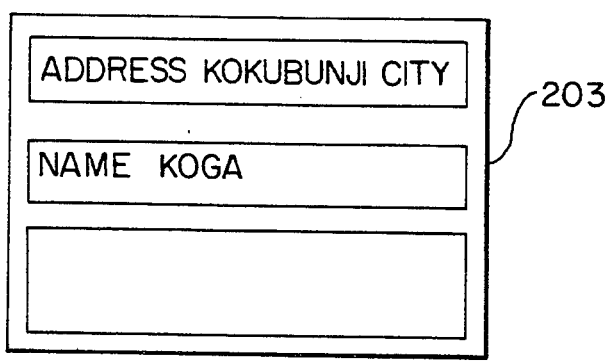

Also, the file document image from the file document image input section 102 is forwarded to the shading removal processor 110, which outputs a de-shaded image 203 that is shown in FIG. 2C consisting of the file document image 202 with the shading removed. The shading removal processor 110 may be of a conventional type. In the shading removal process 110 the format features discriminated by the document format discriminator 108 from among the various format features stored in the document format feature memory 106 are used to obtain from the template image memory 107 the template image 201 that is useful in removing the shading from the file document image 202 to obtain the deshaded image 203. The removal of the shading by the shading removal processor 110 is effectively carried out with reference to the density of the number of lines of the shading of the retrieved template image, which was retrieved from the template image memory 107. The de-shaded image 203 output from the shading removal process 110 is encoded, for example by compression encoding according to a know method such as MH encoding, or MMR encoding and stored in the deshaded storage memory 111. Then, since the deshaded image 203 consists solely of the document border(s) characters and the like without shading, the transition back and forth between black and white is not at all frequent when compared with the transition that would be necessary in encoding the file document image 202, that is the run length is often longer with the deshaded image 203 as compared with the shaded file document image 202. Accordingly, with such a favorable encoding run length, the compression efficiency for the encoding, for example MH or MMR encoding is corresponding high, and therefore the storage of the compression encoded deshaded image takes up far less memory in the deshaded image memory 111 than would be required by trying to store a compressed shaded image 202. Therefore, the system of the present invention is able to store a large number of documents with far greater memory efficiency than the prior art.

File document images are retrieved by inputting image retrieval conditions via an image retrieval condition input section 103, which may be a conventional keyboard or other known input means. The input image retrieval conditions, for example the identification of a specific document to be retrieved, are forwarded to a template image retrieval section 112, which uses the image retrieval conditions to access the document format feature memory 109 and thereby retrieve the document format features that match the image retrieval conditions, and these retrieved document format features are then output to the shaded image synthesizer 114. Also, the template image retrieval section 112 uses the image retrieval conditions to access the template image memory 107 for retrieving the template image 201 from the template image memory 107 that corresponds to the retrieved document format features and thereafter outputs the template image 201 to the shaded image synthesizer 114.

The image retrieval conditions are also output from the image retrieval condition section 103 to a deshaded image retrieval section 113, which uses the image retrieval conditions to access the deshaded image memory 111 for retrieving the deshaded image 203 that matches the input image retrieval conditions. The deshaded image retrieval section 113 then outputs the retrieved deshaded image 203 to the shaded image synthesizer 114.

The shaded image synthesizer 114 synthesizes a shaded image by combining the above mentioned outputs of the template image retrieval section 112 and the output of the deshaded image retrieval section 113. The shaded image synthesizer 114 combines both the template image 201 and the deshaded image 203, and the resulting synthesized shaded image output of the shaded image synthesizer 114 is fed to a shaded image output section, which can include a selected one or more of the shaded synthesized image memory 115 for storing the shaded image, the shaded synthesized image transmission section 116 for transmitting the shaded image to a remote location or other apparatus at the same location, shaded synthesized image printing section 117 for producing a hard copy of the shaded image, and the shaded synthesized image display 118, which may be a display screen, for viewing these shaded images.

As a variation of the above apparatus processing, the shading removal processor 110 can employ the template image received from the template image memory 107 to also remove all of the borders from the file document image 202 so that the deshaded image would then be the same as the deshaded image 203 without the borders, which would further improve the compression encoding prior to the storage in the deshaded image memory, and thereby further improve the efficiency of encoding and storing. In such a case, the borders would be obtained from the template image retrieved from the template image memory 107 and combined with the deshaded image in the shaded image synthesizer along with the combination of the shading. Further, since the deshaded image is compression encoded, the deshaded image would be decoded in the deshaded image retrieval section 113 or shaded image synthesizer 114.

In the foregoing, the storage and retrieval of a file document image has been explained. Now, with reference to FIG. 2, the principal of the shading removal processing that occurs in the shading removal processor 110 will be explained.

FIGS. 2A thru 2D are useful in explaining the shading removal processing.

FIG. 2A shows a schematic representation of the template image 201 that is inputted via the template image input section 101 and stored in the template image memory 107. The template image 201 includes pre-printed characters 205, lines 206, borders 207, shading 208a, 208b, and 208c, and the like. The shading 208a is different in nature and character than the shading 208b, which in turn is different than the shading 208c. A schematic representation of a file document image 202 is shown in FIG. 2B as is input via the file document image input section 102. The file document image 202 is an image of a document consisting of a standard document image (that is a template image 201) together with modifications, such as the typewritten name "KOGA" and the address "KOKUBUNJI CITY". A schematic representation of a deshaded image 203 that is output by the shading removal processor 110 is shown in FIG. 2C. The deshaded image 203 consists solely of the lines 206, borders 207, characters 205 etc. of the document.

Figure 2D:
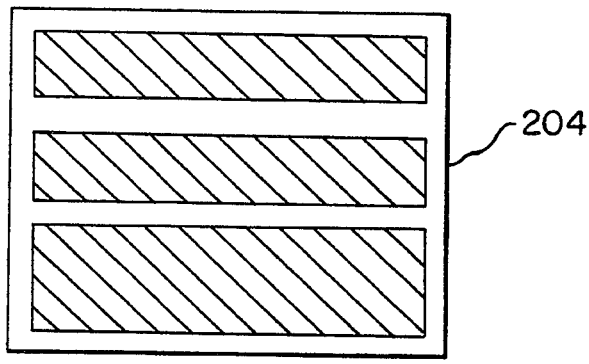

As mentioned previously, the template image retrieval section 112 can retrieve the template image 201 from template image memory 107. Alternatively, the template image retrieval section, using the document format features from document format feature memory 109, can generate shading in regions appropriate to the regions of the original shading and output to the shaded image synthesizer the shaded region image 204 as shown in FIG. 2D. The shaded regions of the shaded region image 204 are obtained by assigning the pixels within the shading 208a, 208b, 208c of the file document image 202 the value of one and the pixels in all other regions the value of zero, prior to compression coding, which simplifies compression encoding and increases efficiency; upon retrieval, the regions having the value of one are provided with synthetic shading such as that shown in FIG. 2D, which may or may not, (in the example it is not) be the same as the shading 208a, 208b and 208c of the input file document image 201. The shaded image synthesizer then combines (for example by ORing) the shaded region image 204 and the deshaded image 203 to produce a synthetic image, with shading.

Therefore, it is seen that the apparatus of FIG. 1 may be operated in three ways, for example, by combining the deshaded image 203 and the shaded region image 204, or by combining the deshaded image 203 and the template image 202, or by combining the shaded region image 204 and a deshaded image corresponding to the deshaded image 203 with the lines and borders removed. These different methods have different corresponding compression and encoding efficiencies, which are all superior to the prior art operation.

The shading removal processor 110 shown in FIG. 1 is preferably an integrated circuit, more specifically an LSI, shown within dotted lines in FIG. 3. In FIG. 3, the elements of the shading removal processor 110 are shown. An image input section 301 inputs an original file document image in the form of a dither processed digital image, for example, directly from the file document image input section 102 of FIG. 1.

When the file document image, with shading, is directly digitized by ordinary binarization in the file document image input section 102, the shaded portions are smeared to the extent of making it impossible to read the characters written over the shading. On the other hand, when systematic dither processing is used, the character patterns become blurred. However, since the pixel pattern of an image obtained by error diffusion is not dependent on the shading dots, but is dependent on the mean density of the image, it is difficult to extract the shaded regions by texture analysis employing a template or Fourier measurement. The processing according to the present invention, described herein, is designed to cope with these characteristics of an error diffusion image.

The file document image 202 output from the image input section 301 is sent to a spatial filtering section 302, a vertical edge detector 304 and a lateral edge detector 306, where it is subjected to linear spatial filter processing for obtaining, respectively, three multivalue image outputs. The spatial filtering section 302 has an effect equivalent to that of approximately reconstructing original multivalue data from the dither processed image. The vertical edge detector 304 and the lateral edge detector 306 have an effect equivalent to that of approximately reconstructing the original multi-value data from the dither processed image and differentiating the results along respective axes. The results of the processing by the spatial filtering section 302, the vertical edge detector 304 and the lateral edge detector 306 are respectively output and then binarized by binarization processors 303, 305, 307. The OR section 308 logically ORs the outputs of the binarization processor 305 and the binarization processor 307, and outputs the result to the OR section 309. The OR section 309 logically OR's the output of the binarization processor 303 and the output of the OR section 308 to produce a result that is outputted to a thickener 310. The thickener 310 thickens the digital image output by the OR section 309, preferably in the vicinity of 8. For example, there may be two methods of thickening, respectively in the vicinity of 4 and the vicinity of 8. Thickening in the vicinity of 4 means that the gray level shading of each pixel is obtained by adding the gray level of the shading of 4 surrounding pixels (that form a cross with the "each pixel" in the center) and obtaining an average, while the thickening in the vicinity of 8 means that the gray level value for each pixel is obtained by adding the gray level values of the 8 surrounding pixels (in a square about the "each pixel") and obtaining an average. The output of the thickener 310 is logically ANDed in the AND section 311 along with the file document image from the image input section 301, and the result is output to an image output section 312 for outputting the digital deshaded image to the deshaded image memory 111. As shown, the template image from the template image memory 107 and the document format feature information from the document format discriminator 108 are also input to the image input section 301 to control the processing within the shading removal processor 110. It is particularly advantageous to configure the shading removal processor 110 as an LSI to realize faster processing and reduce the size of the system hardware.

Figures 4A, 4B, 4C:
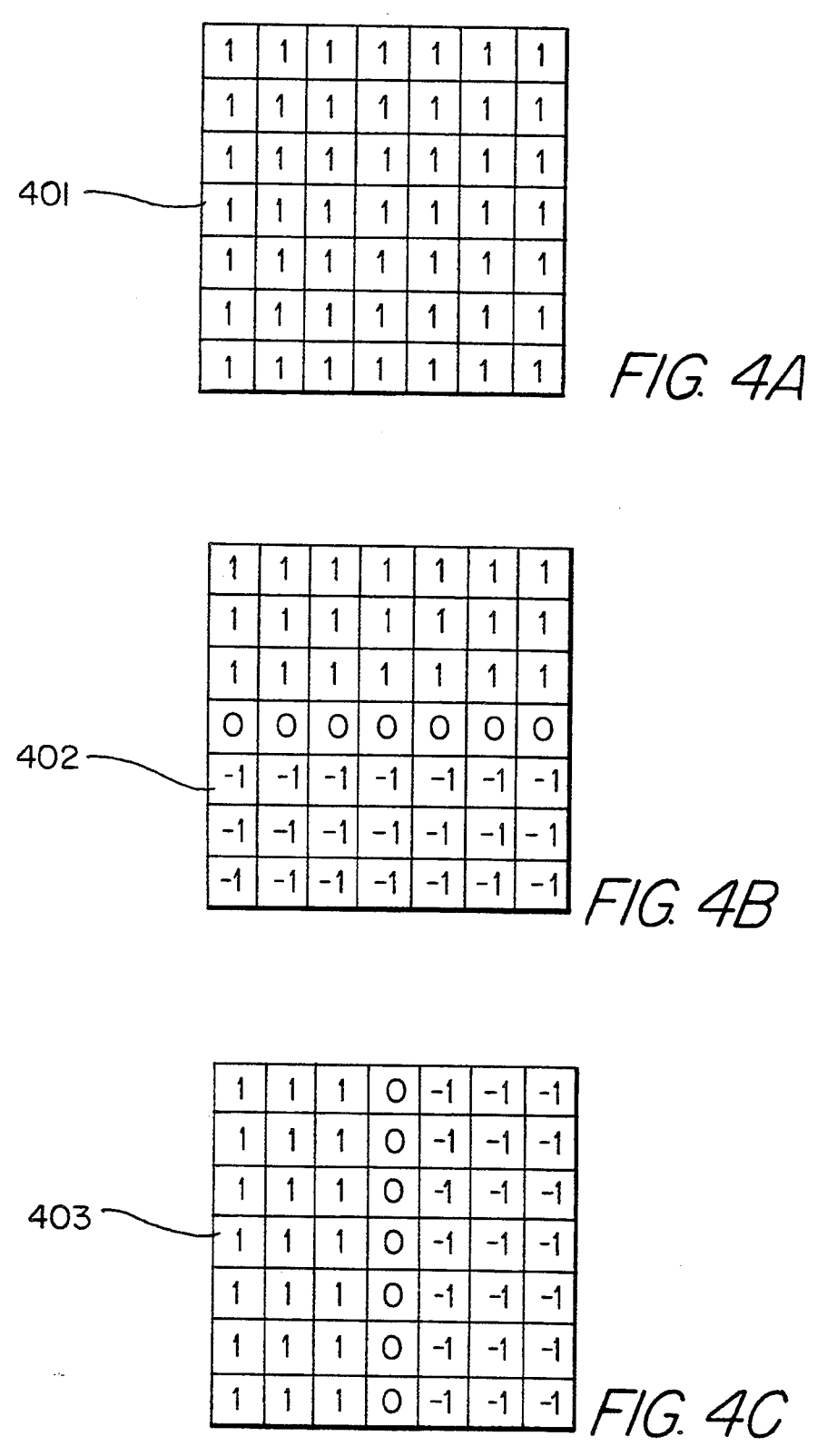

FIGS. 4A, 4B and 4C respectively show the matrixes of the filters 401, 402 and 403 used in the spatial filtering section 302, the vertical edge detector 304 and the lateral edge detector 306 of the shading removal processor 110 of FIG. 3. Filter processing in the spatial filtering section 302 is conducted using the matrix 401 shown in FIG. 4A. This filter processing extracts the regions in which the characters 205, the lines 206, the borders 207 and other black pixels are centered. The vertical edge detector 304 and the lateral edge detector 306 conduct filter processing using the matrixes 402 and 403 shown in FIGS. 4C and 4B. The filter processing using these matrixes 403 and 402 extracts those regions where the density of the black pixels changes rapidly, such as at the character and border edges. The matrix 402 is for detecting rapid black pixel density change in the vertical direction and the matrix 403 is for detecting rapid black pixel density change in the lateral direction. The operation of such filter matrixes is readily known from the representation shown.

Figure 5:
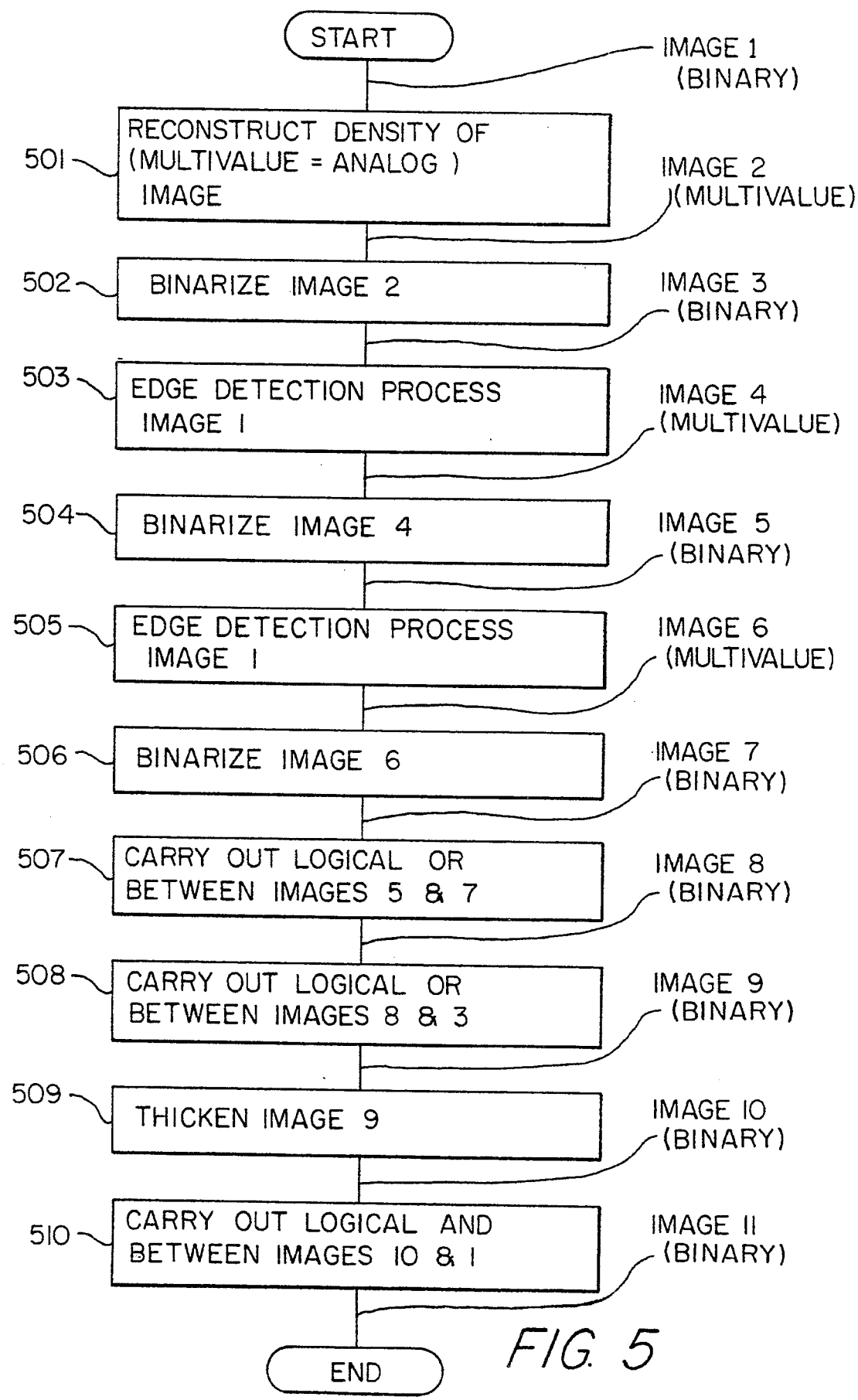
FIG. 5 is a flow chart of a shading removal process of the present invention which uses matrixes of filters.

FIG. 5 is a flow chart of the procedures used in the method for shading removal according to the present invention, as conducted by the shading removal processor 110 of FIG. 1, more specifically shown in FIG. 3. The image 1, which is in a digital form, and preferably the file document image 202, is provided at the start to step 501, in which the image is subjected to spatial filtering for reconstructing at least two densities for obtaining a multibit image 2 in spatial filtering section 302. The image 2 is binarized in step 502 as performed in the binarization processor 303, to obtain digital image 3. The multibit image comprises a plurality of bits to describe each pixel and is thus a multivalue image. The result of binarization, that is the digital image 3, employs a single binary bit for each pixel. Steps 503 and 504 can be conducted after steps 501, 502 or in parallel therewith. In step 503, the lateral edge detector 306 of FIG. 3 performs an edge detection process upon the image 1 (image 202 for example). Step 503 outputs a multivalue or multibit image 4 to step 504 where it is binarized to produce binary image 5 in the binarization processor 307. Steps 505 and 506 may be conducted in series with steps 503, 504 and steps 501, 502 or in parallel therewith. In step 505, the vertical edge detector 304 processes the image 1 (for example the file document image 202) for obtaining the multibit or multivalue image 6, which is binarized in step 506 with the binarization processor 305 to produce the digital image 7. In step 507, the OR section 308 logically ORs the binary images 5 and 7 to output a digital image 8. In step 508, the OR section 309 logically ORs the digital images 8 and 3 to output digital image 9. In step 509, the thickener 310 thickens the digital image 9 to produce a thickened digital image 10. In step 510, the AND section 311 logically ANDs the digital images 10 and 1 to output a digital image 11 to the image output section 312. Thus, the digital image 11 is the deshaded image, that is the image 1 with the shading removed, for example the file document image 202 with the shading removed, that is the deshaded image 203.

While the shading removal processing of the shading removal processor 110 has been explained above with respect to an example using the matrix in FIG. 4, it is also possible to employ any of the various other methods of deshading, such as (1) Fourier measurement shown for example in R. Bajcsy "Computer Identification of Visual Surface", Computer Graphics and Image Processing, Reel Two, 1973, pages 118–130, or (2) secondary measurement shown for example in Robert M. Haralick et al "Texture Features for Image Classification" IEEE Transactions On Systems Man And Cybernetics, VOL. SMC-3, No. 6, November, 1973, pages 610–621.

For small scale document filing, it is not necessary to employ all of the structure shown in FIG. 1, therefore some of the structure shown in FIG. 1 can be eliminated or merely bypassed with economical manufacturing, to produce a simplified filing system in FIG. 6. In this relatively small scale document filing system of FIG. 6, shading is removed and restored with respect to, for example, a single type of template image and file document image. A document filing system is defined as a system used mainly for storing documents, although it may have other features.

As shown in FIG. 6, a template image input section 601 is an image input device, such as a scanner for reading a blank standard document and outputting a corresponding digital template image 201 to serve as the standard, and its structure may be the same as that of template image input section 101 of FIG. 1. A template image memory 602, which may be the same as element 107 of FIG. 1, stores the digital template image 201 to serve as the standard. A file document image input section 603, corresponding to 102 of FIG. 1, reads a file document to be filed, consisting of a standard document having modifications such as handwriting or the like added thereon, and outputs a corresponding digital file document image 202. A shading removal processor 604, corresponding to the shading removal processor 110, removes shading from the file document image 202 to produce the deshaded image 203. The deshaded image 203 is stored in the deshaded image memory 605, corresponding to the deshaded image memory 111. A shaded image synthesizer 606, corresponding to element 114 of FIG. 1 combines the two input digital images 201 and 203 to produce a shaded synthetic image, as explained previously. This shaded synthetic image is then guided to the shaded synthetic image output section 607, which may include one or more of the output section 115, 116, 117, 118 of FIG. 1. This simplified filing system enables document filing to be conducted efficiently with minimum hardware in cases where shading is removed from document forms to be filed with a clearly defined single template image.

Figure 7:
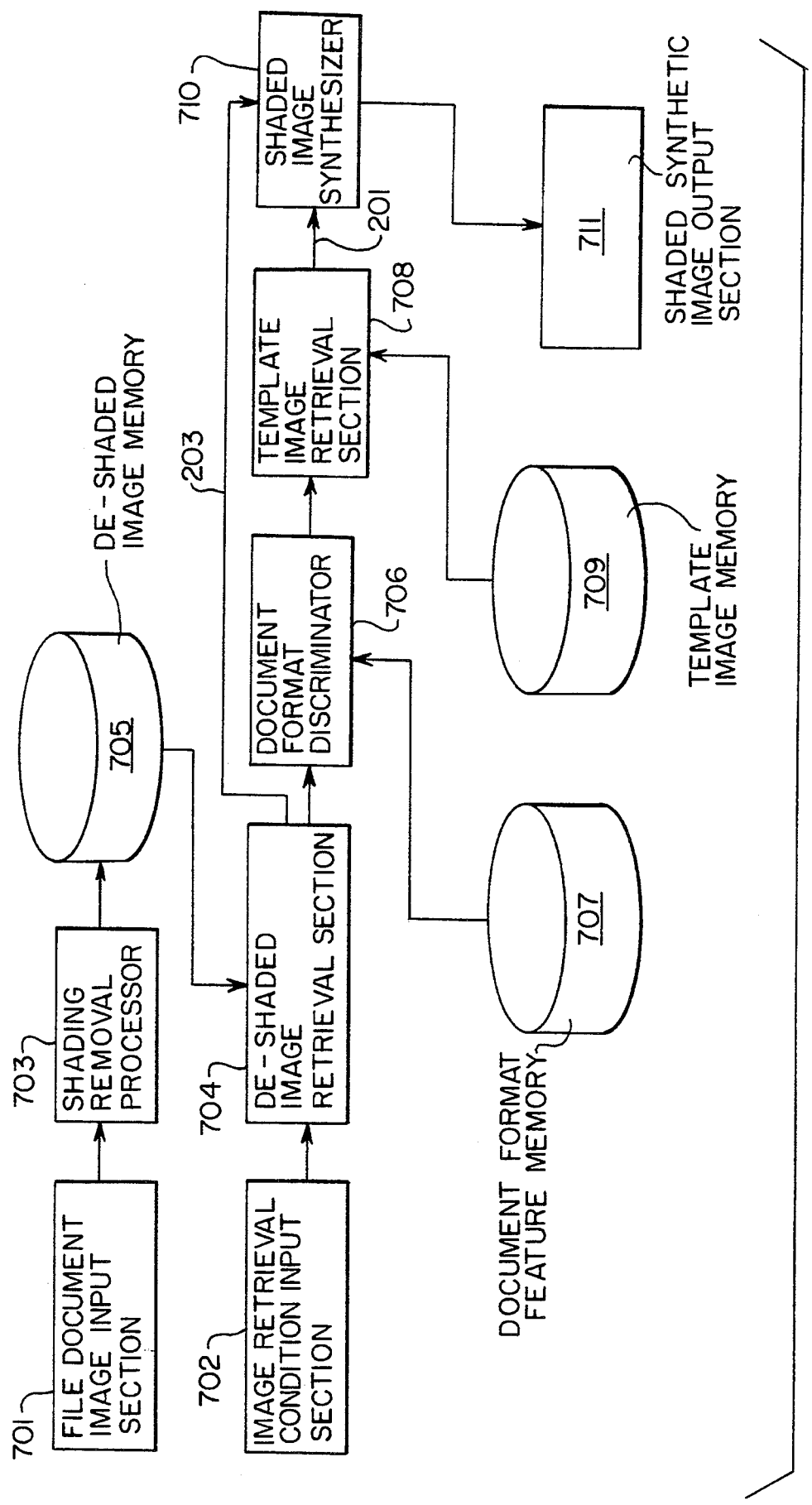
FIG. 7 is a block diagram of a portion of the apparatus shown in FIG. 1 to produce a simplified document filing system, that is a subcombination of FIG. 1, shown in more detail to include template image storage and retrieval.

FIG. 7 shows a portion of the apparatus shown in FIG. 1, with further details relating to additional elements 706–709. Elements 701, 702, 703, 704, 705, 710 and 711 correspond respectively to elements 102, 103, 110, 113, 111, 114 and 115–118 of FIG. 1, where the foregoing description applies. FIG. 7 therefore shows a document filing system in which document formats and other such image conditions are input synthesized with various template images stored in memory.

A file document image, to be filed, is input as a digital file document 202 via a file document image input system 701, which is an image input device, such as a scanner. The file document image 202 is forwarded to a shading removal processor 703 which converts it into a digital deshaded image 203. The deshaded image 203 is forwarded from the shading removal processor 703 to a deshaded image memory 705 where it is compression encoded and stored in memory. The file document images are retrieved by inputting retrieval conditions via an image retrieval condition input section 702, which can be a keyboard or other such input device. The thus input retrieval conditions are forwarded to a deshaded image retrieval section 704 which retrieves the deshaded image 203 of the document by matching the input retrieval conditions with the stored conditions from the deshaded image memory 705. The retrieved deshaded image 203 is forwarded to a document format discriminator 706 which identifies the format of the file document by analyzing the file document image with reference to the contents of a document format feature memory 707. The document format identified is forwarded to a template image retrieval section 708 which retrieves template image 201 matching the document format from a template image memory 709. The retrieved template image 201 is sent to a shaded image synthesizer 710 which synthesizes the outputs 201 or 203, that is combines them, from the template image retrieval section 708 and the deshaded image retrieval section 704. The shaded image synthesizer 710 produces a shaded synthetic image that is then output to the shaded synthetic image output section 711 to be used for various purposes such as mentioned in FIG. 1, including being sent to memory, a printer, a facsimile, a CRT or the like.

Once a number of different types of template images 201 have been stored within the template image memory 107, as described above, the system according to the present invention as shown in FIG. 7 is able to automatically remove and restore shading from and to the file document and deshaded images 202, 203 respectively, that is without the need for the operator to specify the template image.

The system of the present invention, as described above, is also capable of transmitting and receiving images. FIG. 8 shows a variation of portions of FIG. 1, for the transmission of images in a more efficient manner than in the prior art, particularly so the transmission is of deshaded compression encoded images. A digital file document image 202 to be transmitted is inputted via the document image input section 801, which corresponds to the document image input section 102 of FIG. 1 and may be any type of input device, such a scanner. The digital file document image 202 is forwarded to a shading removal processor 802, corresponding to the shading removal processor 110 of FIG. 1, which converts the image 202 into a digital deshaded image 203. The deshaded image 203 is forwarded from the shading removal processor 202 to a deshaded image transmission section 803, which transmits the deshaded image, preferably in compression encoded form, over a transmission line, for example a telephone line or special data line. The document input section 801 also forwards the document image 202 to a shaded region extractor 804, which converts the image 202 into a digital shaded region image, in which regions such as those shown in FIG. 2D where there is shading in the input image 202 are assigned a value of one and all other regions are assigned a value of zero, which greatly increases the efficiency of compression encoding. The digital shaded region image is then forwarded to a shading region image transmission section 805, which compression encodes the same and transmits the encoded shaded region image over a transmission line or data line. Instead of encoding, only the coordinates of the shaded region may be sent.

The shaded region image transmitted by the shaded region image transmission section 805 is received and decoded by a shading generator 806 which then generates a reshaded region image 204 having shading at the regions where the pixel values have a value of one in the decoded image. The reshaded region image is forwarded to a shaded image synthesizer 804, corresponding to the shaded image synthesizer 114 of FIG. 1, where it is combined with the deshaded image 203 that was transmitted from the deshaded image transmission section 803 and decoded after reception. The shaded synthesized image is output from the shaded image synthesizer 807 and forwarded to a shaded synthetic image output section, which may include one or more of the sections 115–118 of FIG. 1 for outputting the results of the process by the shaded image synthesizer 807, for example to a memory, a printer, a facsimile, a CRT, or the like. The apparatus of FIG. 8 may be incorporated with the apparatus of FIG. 1, or considered as a stand alone image transmission and receiving apparatus in simplified form, with the additional structure described above either disabled or removed. Therefore, FIG. 8 discloses an integrated system which enables shaded file document images 202 to be input from a remotely located input apparatus 801 and then efficiently transmitted in deshaded form by transmission sections 803, 805 to another location where they are reshaded and, as such, the apparatus can be used, for example, for document transmissions between a branch office and a head office in an efficient manner due to the very efficient compression encoding.

Additional details of the basic simplified apparatus of FIG. 1 are further shown in FIG. 9, again for document transmission and reception, where elements 903, 906, 908, 911 and 912 correspond respectively to elements 801, 802, 803,807 End 808 of FIG. 8. As an alternative to the elements 804, 805, 806 of FIG. 8, which selectively may be accessed by a suitable user operated switch, FIG. 9 discloses additional elements 905, 904, 907, 909 and 910 for providing document format information and template image retrieval instead of shading region information and shaded region generation. Therefore, FIG. 8 shows the transmission apparatus set up for extraction and transmission of shaded regions 204, while the apparatus of FIG. 9 is set up for the retrieval and transmission of template images 201, which template images 201 are stored in advance and transmitted as document formats or identification thereof.

An image transmitter 901, which may be an integrated circuit, and an image receiver 902, which may be an integrated circuit, are located at places remote from each other. An image of the document to be input is input as a digital file document image by document image input section 903, which is any type of input device, such as a scanner. The input image 202 is forwarded to a document format discriminator 904, which identifies the format of the input file document image 202 by analyzing the input file document digital image 202 with reference to format information stored in a document format feature memory 905. The input file document image 202 is also forwarded to a shading removal processor 906, which converts it to a digital deshaded image 203. The digital deshaded image 203 is compression encoded and transmitted by the deshaded image transmitter 908 over suitable telephone or data lines to the image receiver 902. Digital template images 201 are stored in a template image memory 909. The format identifier determined by the document format discriminator 904 is forwarded to a document format transmitter 907, which transmits it over a suitable telephone or date line to a template image retrieval section 910, which uses it to retrieve the corresponding digital image from the template image memory 909. The retrieved digital template image is sent to a shaded image synthesizer 911, which combines it with the deshaded image 203 transmitted from the deshaded image transmitter 908. The synthesized image is output from the shaded image synthesizer 911 and input to the shaded synthetic image output section 912, which outputs the shaded synthesized image result of the processing by the shaded image synthesizer 911 to an output device, such as a memory, printer, facsimile. CRT or the like.

In the system according to the present invention, the template images 201 are stored in a file, such as the template image memory 901, on the image receiver side, in advance, therefore it suffices to transmit only the document format identifier to determine the template image, the template image including shading to be added to the deshaded image which is also transmitted. Therefore, the transmission of the document format identifier, which can be a simple code, is very efficient in transmission time and bit quantity when compared to the prior transmission of bits identifying all of the shading and other features of a standard form, such as lines and borders.

Figure 9:
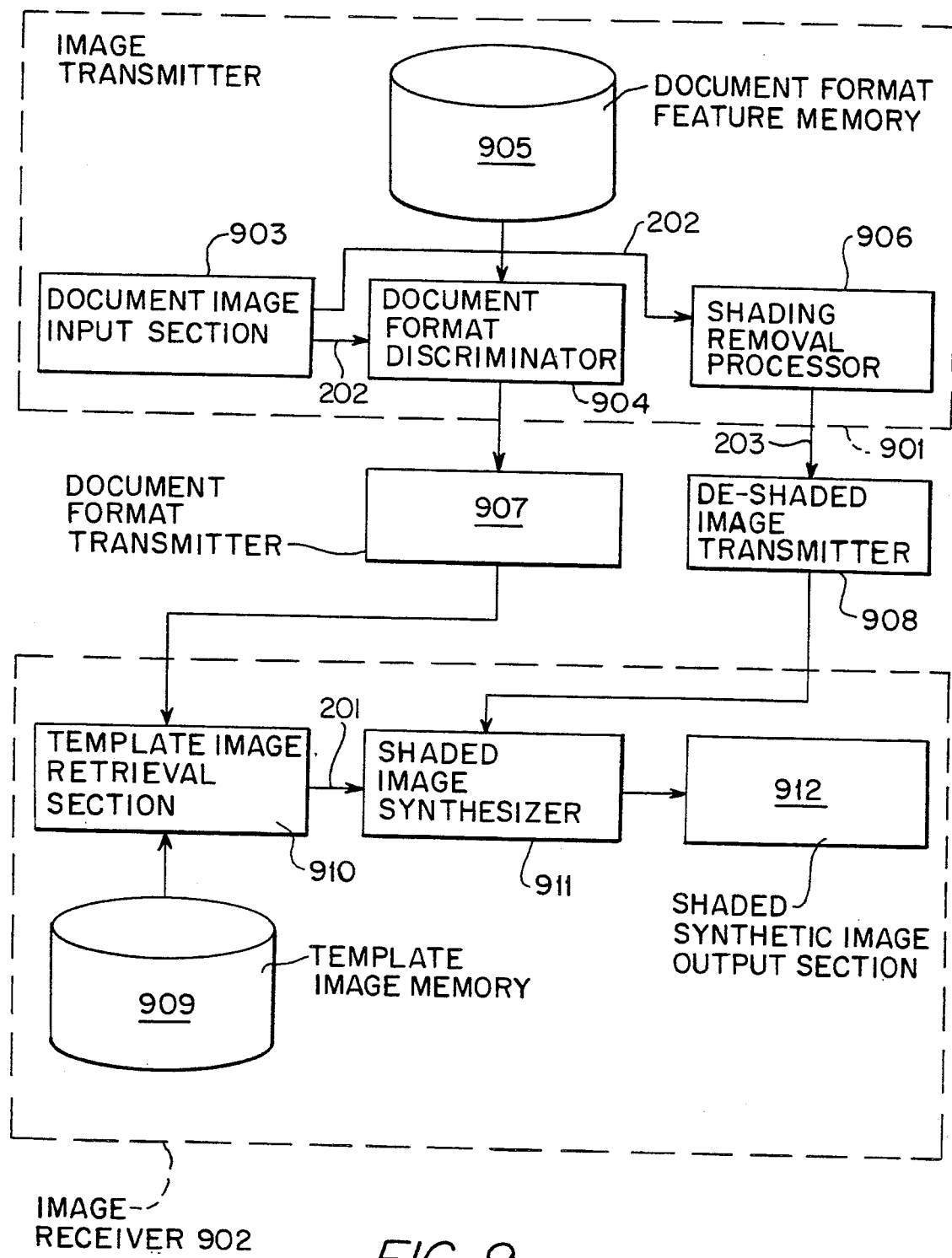
FIG. 9 is a block diagram including additional details of the transmission system in accordance with FIG. 8, particularly with respect to including document format apparatus and template image retrieval apparatus.
Figure 10:
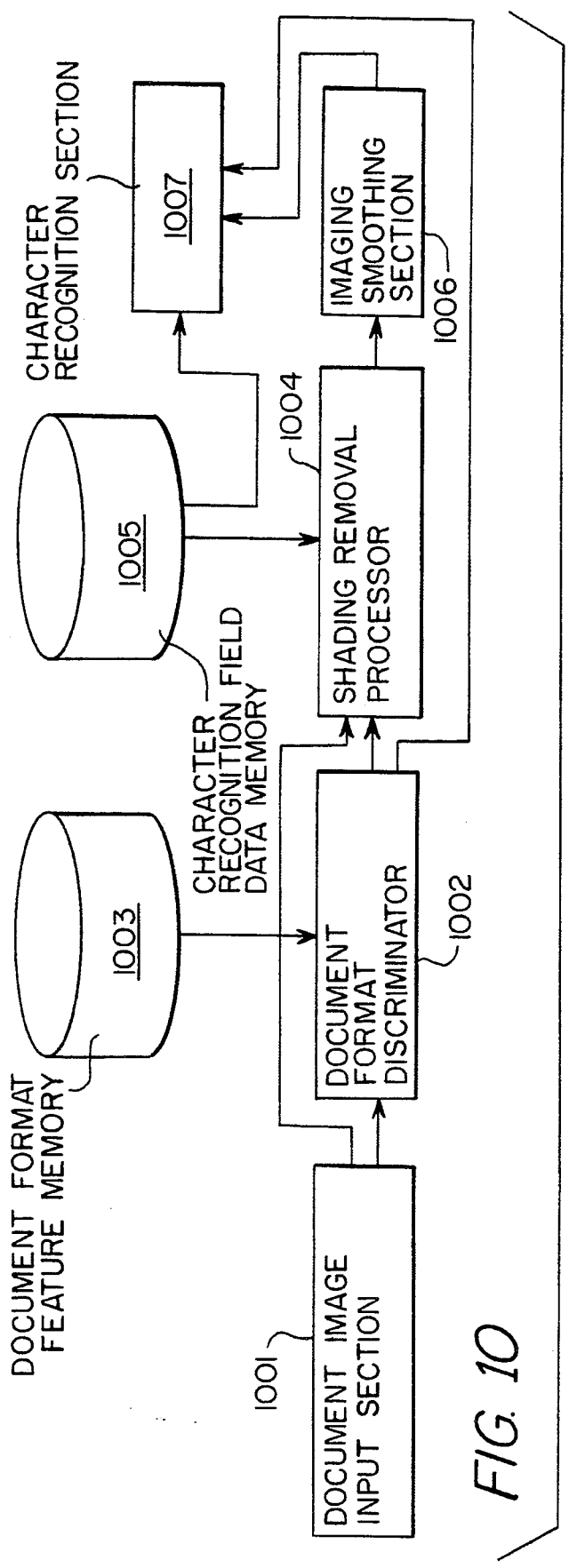
FIG. 10 is a block diagram of a portion of the apparatus of FIG. 9, with additional details relating to character recognition apparatus receiving the transmission of FIG. 9.

The advantage set forth above with respect to the FIG. 9 apparatus are obtained in the mere storage and regeneration of the image, without transmitting the same to a remote location, in accordance with a further selected feature of the apparatus of the preferred embodiment, as shown as a subcombination in FIG. 10, which stores document formats and provides a deshaded image with respect to character recognition.

In FIG. 10, a document image input section 1001, which is an input image device such as the document image input section 102, FIG. 1, which may be a scanner, reads input file documents and produces corresponding digital file document images 202. The documents read by the system are on standard size paper and preprinted as a form with character boxes composed of lines and borders, specific to each format and/or shading, which have nevertheless been modified, for example, by being filed in with characters after preprinting of the form, which has been described previously with respect to all the input images. As previously described, the document image input section 1001 does not have to drop out shading dots by using a drop out color. A digital document image 202 produced by the document image input section 1001 is forwarded to a document format discriminator 1002, which corresponds to the document format discriminator 904 of FIG. 9, which identifies the format of the input file document image by analyzing one or more of the borders, lines, shading and other features of the standardized portion of the input file document image 202, with reference to the contents of a document format feature memory 1003, which corresponds to the document format feature memory 905 of FIG. 9. The coordinates of the character boxes read are stored in a character recognition field data memory 1005, separately for each format. The document image 202 is also forwarded directly to a shading removal processor 1004, which corresponds to the shading and removal processor 906 of FIG. 9, which further receives the document format identifier determined in the document format discriminator 1002. Referring to the format features, such as the character box coordinates, stored relative to the format identifier in the character recognition field data memory 1005, the shading removal process 1004, which corresponds with the shading removal processor 906 of FIG. 9, converts the document image 202 into a digital deshaded image 203, for example the image having the shading removed from the character boxes. The deshaded image 203 is forwarded to an image smoothing section 1006, which removes irregularities and noise from the image profile. The smooth digital image is sent to a character recognition section 1007, which also receives the document format identifier determined in the document format discriminator 1002. By using the document format identifier for referring to the character box coordinates stored in the character recognition field data memory 1005, the character recognition section 1007 reads the characters in the image output by the image smoothing section 1006. By carrying out image smoothing, the apparatus of FIG. 10 enables line images to be directly used in character recognition without recognition being prevented by shading and without requiring drop-out colors.

Figure 11:
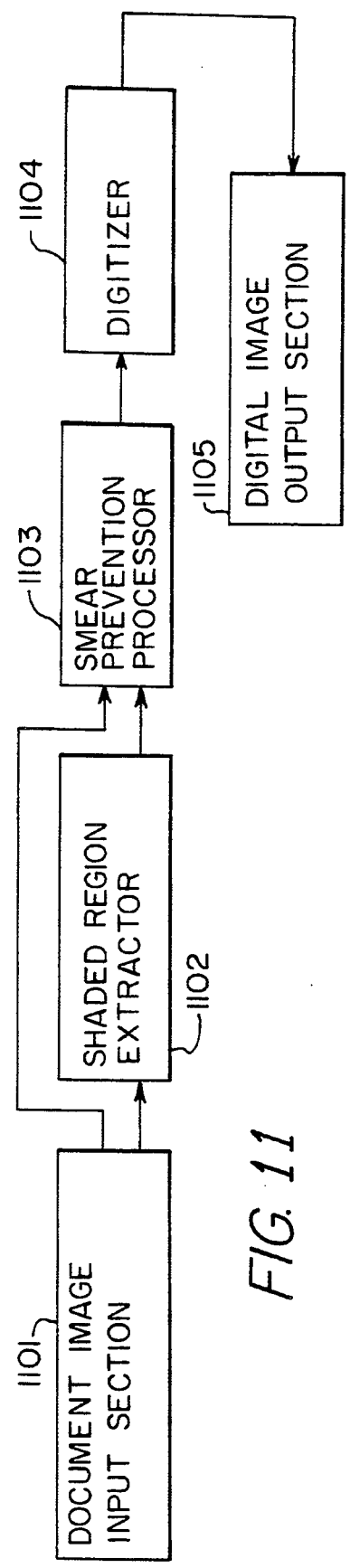
FIG. 11 is a block diagram of a portion of FIG. 1 with additional details relating to smear prevention processing.

As a further feature of the present invention, file document images are input and smear prevention-processed so that the digital image is not affected by shading. That is, after detecting the shading and processing, there is outputting of a digital image that is unaffected by the shading, without removing the shading. More specifically, in FIG. 11, the document image input section 1101, which corresponds to the document image input section 102 of FIG. 1, reads documents and produces corresponding multibit images. The multibit digital images produced by the document image input section 1101 are forwarded to a shading region extractor 1102, corresponding to the shading region extractor 804 of FIG. 8, which extracts the shaded regions from the image. The output of a shaded region extractor 1102 is forwarded to a smear prevention processor 1103, which also receives the multibit image produced by the document image input section 1101. The smear prevention processor 1103 carries out smear prevention processing with respect to the shaded regions extracted by the shaded region extractor 1102 to prevent these regions from being smeared out during digitizing. The processing for smear prevention can be carried out by reducing the density of the overall image using gamma correction or the like. The image output by the smear prevention processor 1103, where smear prevention processing was carried out only with respect to shaded regions, is forwarded to a digitizer 1104 for digitizing. The thus digitized image output is forwarded to a digital image output section 1105, which corresponds to one or more of the sections 115–118 of FIG. 1. With the apparatus of FIG. 11, the document image having shading is converted to a digital image without removing the shading, and smear prevention processing is performed with respect to the shading regions for improving the image, which makes it possible to employ ordinary digital image processing techniques without any particular modification to produce a superior output.

Figure 12:
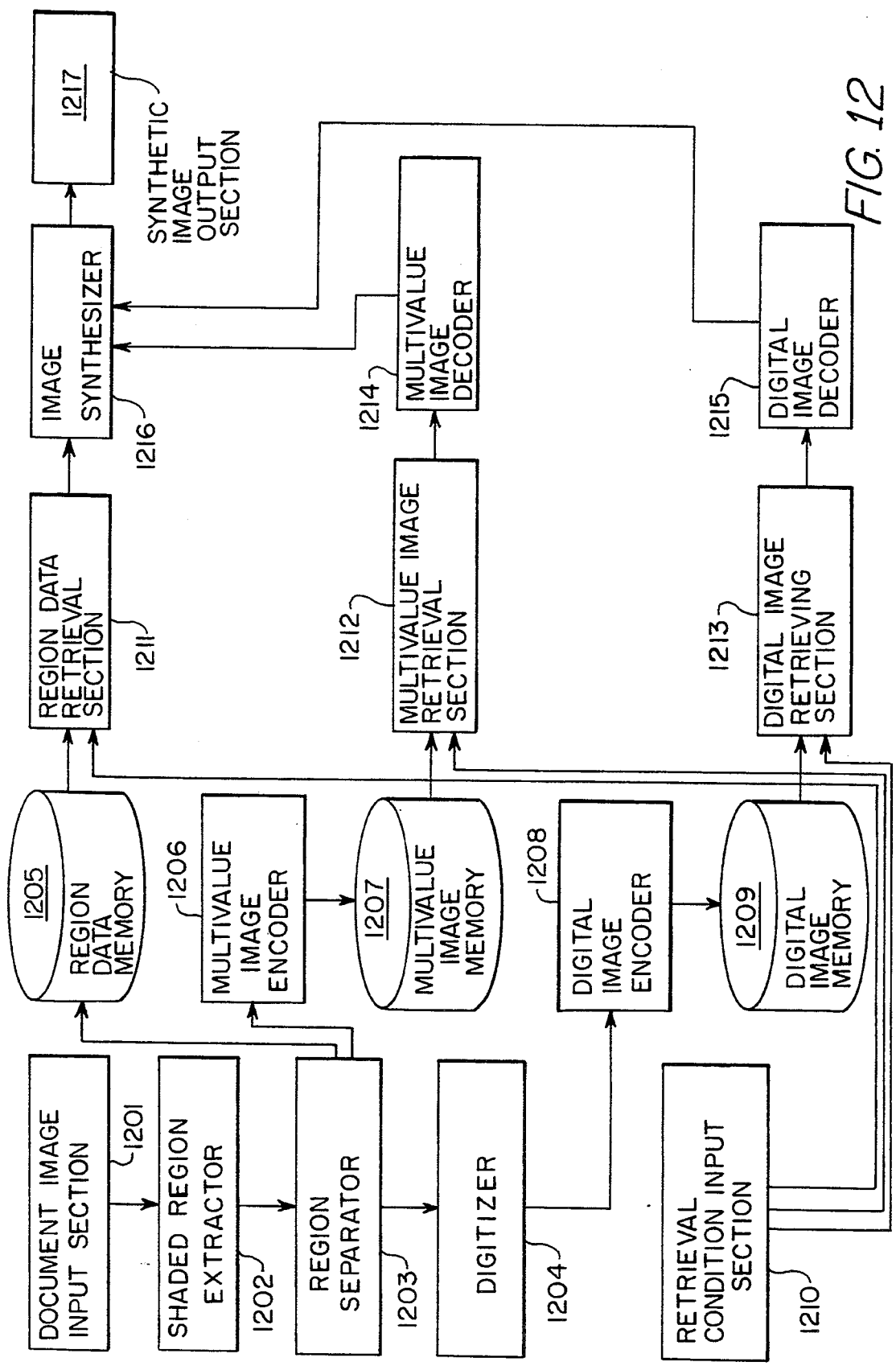
FIG. 12 is a block diagram of a document filing system according to the present invention.

In the apparatus of FIG. 12, elements having the same name as previously described elements have the same structure and function in the same manner as previously described, except insofar as differences are set forth herein. The apparatus of FIG. 12 is a document filing system in which the shading is not removed, but instead the shaded regions are processed as multibit images, the unshaded regions are processed as digital images, and the thus processed multibit and digital images are then combined to produced a synthetic image output.

More specifically, with reference to FIG. 12, a document image input section 1201, which is a type of image input device, converts a file document to be filed into a multivalue file document image. The resulting image is forwarded to a shaded region extractor 1202 for extraction of its shaded regions, and the output of the shaded region extractor 1202 is sent to a region separator 1203 which determines the coordinates of the shaded and unshaded regions. Based on the region data determined by the region separator 1203, a digitizer 1204 digitizes the unshaded regions of the image. The region data, that is the region type and coordinate information, is also forwarded to a region data memory 1205, where it is stored, and to a multibit image encoder 1206, which uses it as reference data for encoding the shaded regions as multibit images and stores the results in a multibit image memory 1207 (multibit and multivalue are used interchangeably). The output of the digitizer 1204 is forwarded to a digital image encoder for compression encoding and the result is stored in a digital image memory 1209.

In FIG. 12, file document images are retrieved by inputting the file document image retrieval conditions via a retrieval condition input section 1201, which can be a keyboard or other input device. The thus input retrieval conditions are forwarded to a region data retrieval section 1211, which retrieves the document region data matching the conditions from the region data memory 1205. The input retrieval conditions are also forwarded to a multivalue retrieval section 1212, which retrieves the encoded multivalue document image matching the conditions from the multivalue image memory 1207. Further, the input retrieval conditions are forwarded to a digital image retrieving section 1213, which retrieves the encoded binary document image matching the conditions from the digital image memory 1209. The encoded multivalue document image retrieved by the multivalue image retrieval section 1212 is forwarded to and decoded by a multivalue image decoder 1214. The encoded binary document image retrieved by the digital image retrieving section 1213 is forwarded to and decoded by a digital image decoder 1215. The outputs of the multivalue image decoder 1214 and the digital image decoder 1215 are forwarded to an image synthesizer 1216, which refers to the output of the region data retrieval section 1211 uses the region data for combining the outputs of decoders 1214, 1215 to produce a multivalue image that is output to a synthetic image output section 1217, which may be one more of the elements 115–118 of FIG. 1. Thereby, input document images are processed to produce clear images irrespective of the density of shading.

In the description of the preferred embodiment given above, processing has been conducted with removal of shading and also conducted without removal of shading. In FIGS. 13 and 14, such selection is generally illustrated. In FIG. 13, removal of shading is or is not conducted depending upon specific conditions.

In FIG. 13, a document is read by a document image input section 1301, which like the corresponding element 102 in FIG. 1 is constituted as an image input device which outputs a digital document image 202 to a shading removal processing condition input section 1302 for inputting conditions which determine whether or not shading removal is to be conducted. These conditions include the document format, the image density, etc., and can be input either by an operator or by the system itself, for example by discriminating the document with the document format discriminator 108 of FIG. 1. When shading removal is to be conducted, according to such conditions, the shading removal processing condition input section 1302 issues a command to this effect to a shading removal processor 1303 which responds by removing the shading from the digital image of the document. The resulting deshaded image output by the shading removal processor 1303 is forwarded to a deshaded image output section 1304 for output, which may be one or more of the elements 115–118 of FIG. 1. When it is decided according to the conditions that shading is not to be removed, the digital image output by the document input section 1301 bypasses the shading removal processor 1303 and is delivered directly to the image output section 1304, without being deshaded. The effectiveness of the preferred embodiment is enhanced by using the shading removal processing condition section 1302 that enables the system to automatically examine an input file document image and discriminate whether or not shading is present from the features of the input image, for example. This automatic discrimination can be conducted, for example, by automatically inserting an optical filter between a CCD sensor and the document image for removing color of the shading dots. Alternatively, it is possible to provide and switch among the plurality of optical sensor and CCD sensor pairs. For example, if shading is not present, the shading removal processor can be bypassed to shorten the amount of processing time. Since this embodiment enables the shading removal conditions to be varied, it can be used for a wide range of applications.

In FIG. 14, the position of a switch determines whether or not the shading removal processor 1402 is to be bypassed or not, for the switch replacing the shading removal conditions of the apparatus described with respect to FIG. 13.

In FIG. 14, a file document is read by a document image input section 1401, which like the corresponding element 1301 may be the file document image input section 102 of FIG. 1. The document image input section 1401 outputs a digital file document image to a shading removal processor 1402, which removes the shading and outputs a deshaded image. The system is provided with a switch 1403, which the operator uses for designated whether or not shading removal is to be conducted. When the switch 1403 is set to the illustrated position indicating that shading removal is not to be conducted, the output of the document image input section 1401 is input without being further processed to a deshaded image output section 1404 that constitutes an image output device of any of the types 115–118 of FIG. 1, thus bypassing the shading removal processor 1402. On the other hand, when the switch 1403 is set to the other position indicating that shading removal is to be conducted, the output of the shading removal processor 1402, the deshaded image, is forwarded to the deshaded image output section 1404. Thus, the switch provides a user friendly system enabling the operator to designate whether or not shading removal is to be conducted, which designation may override the automatic designation provided by the conditions of FIG. 13.

In the above described processing, deshaded images may be provided with a more natural appearance, as more particularly illustrated in FIGS. 15A–15C. As shown in FIG. 15A, an image 1501, which may be an image output from the document image input section, is shown prior to the removal of shading. In FIG. 15B there is shown the same image after the shading is removed from all portions except those regions having information in addition to the shading, to produce a regional deshaded image 1502. The regional deshaded image 1502 can be converted to a natural-appearing shaded image, after storage, transmission or the like, by generating shading and combining the generated shading with the regionally deshaded image 1502 to produce a synthetic shaded image 1503 as shown in FIG. 15C. That is, the image 1503 is obtained by adding "artificial" shading to the deshaded regions of the image 1502. The artificial shading is inserted as horizontal stripes or in some other such patterns exhibiting high compression efficiency when compression encoded by, for example, MH encoding, or the like. In this manner, the synthetic shaded image 1503 may be efficiently compression encoded and stored or efficiently transmitted. This processing provides an image which closely resembles the original image 1501 before shading removal and the synthetic shaded image 1503 has the additional advantage of exhibiting high compression efficiency.

Figure 16:
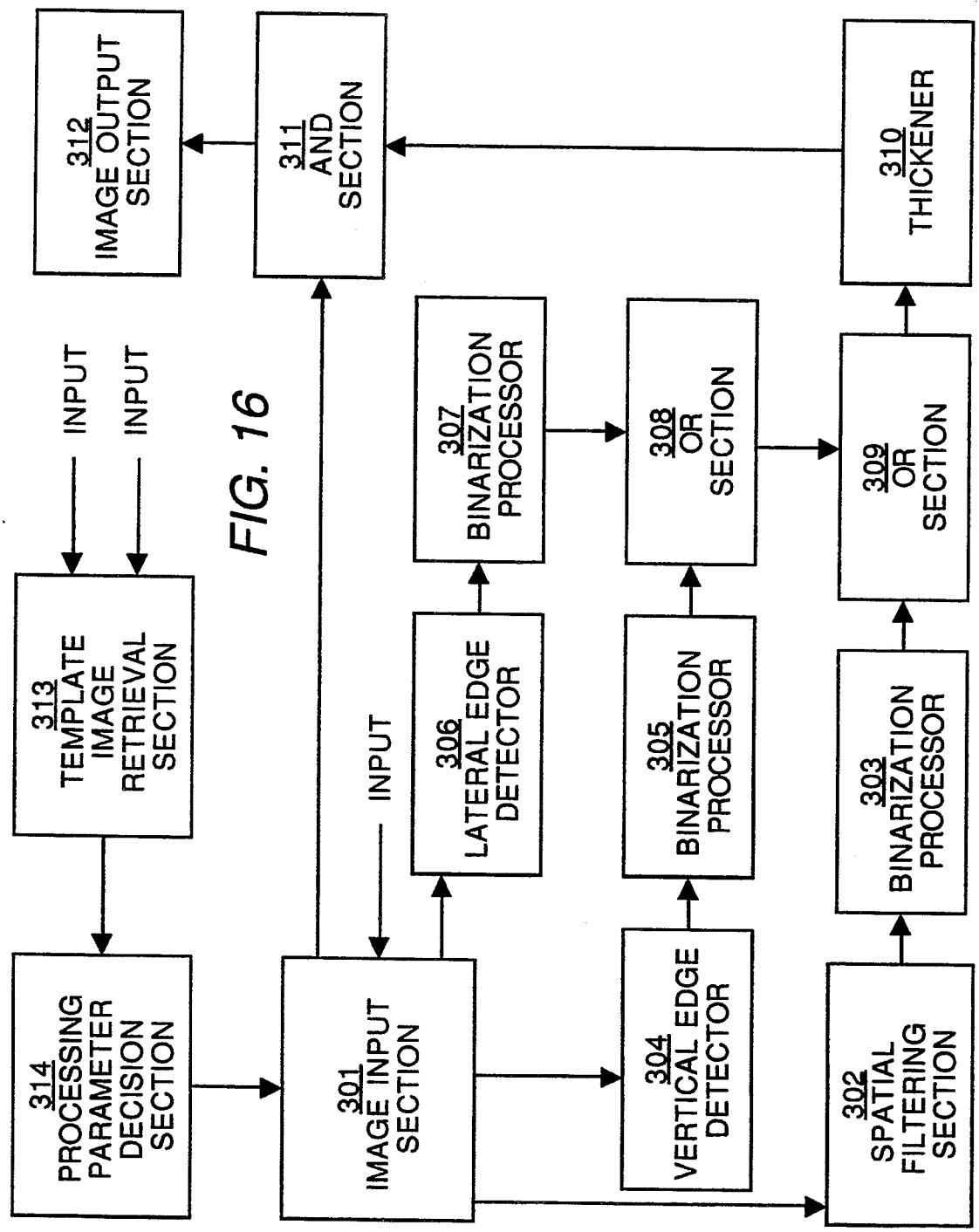
FIG. 16 is a block diagram of a modification of a portion of the FIG. 1 apparatus, specifically a modification of the LSI of FIG. 3.

FIG. 16 shown the apparatus of FIG. 3 in greater detail, that is with the addition of a template image retrieval section 313, which may correspond to the template image retrieval section 112 of FIG. 1, and a processing parameter decision section 314. The template image retrieval section 313 retrieves a template image, for example the template image 201 shown in FIG. 2, which may be retrieved from a template image memory, such as the memory 107 of FIG. 1. The processing parameter decision section 314 decides parameters of shading removal processing, for example matrixes of filters in FIG. 4, threshold levels, etc., in accordance with the retrieved template image. Otherwise, the processing of FIG. 16 is the same as that previously described with respect to FIG. 3.

Figure 17:
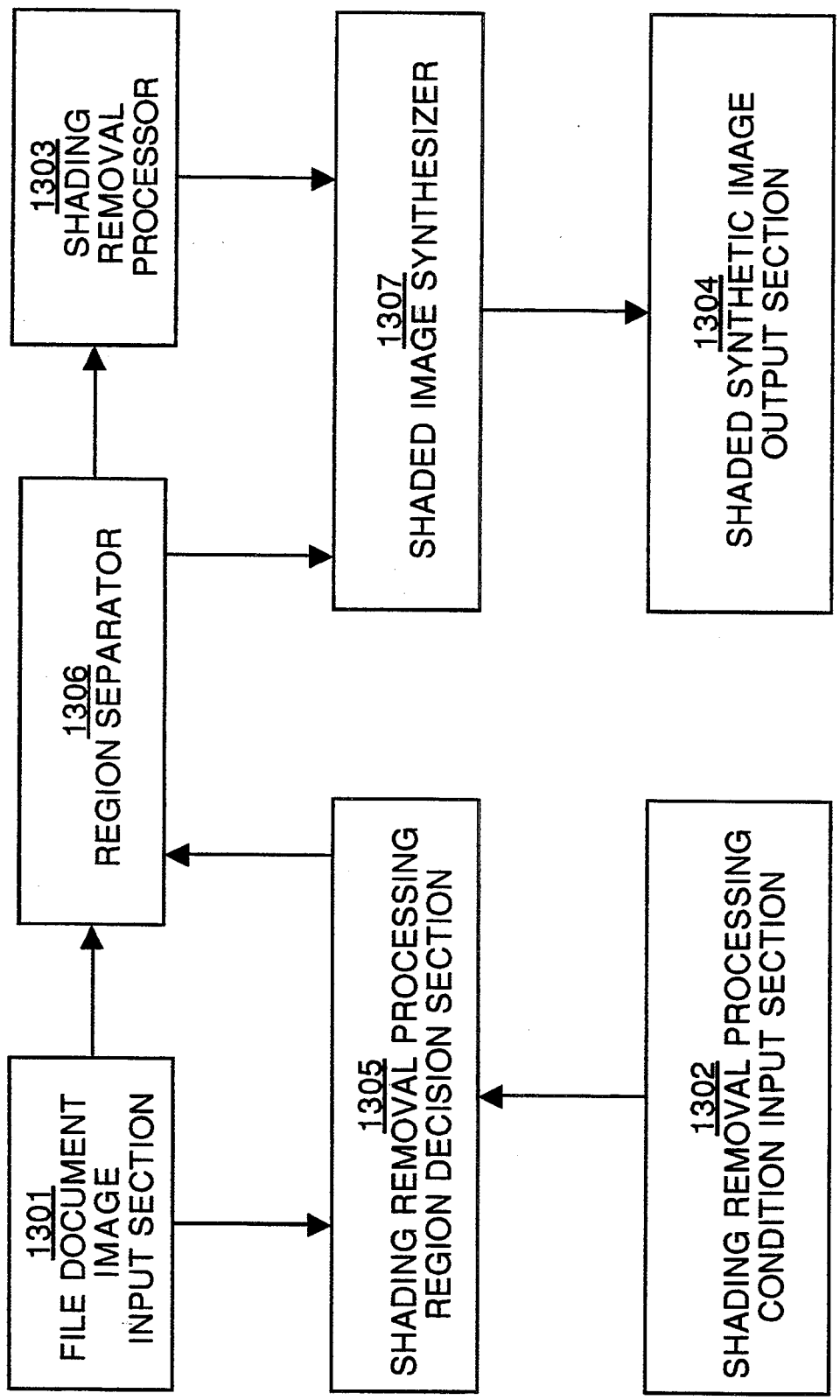
FIG. 17 is a modification of the apparatus of FIG. 13.

The function illustrated by FIG. 13, for the preferred embodiment, may also basically be provided by the modification according to FIG. 17, wherein like numerals are used for like elements having the same structure and function as set forth with respect to FIG. 13. In FIG. 17, the file document image input section 1301 reads a document, for example by scanning, and outputs a binary image as indicated. The shading removal processing condition input section 1302 inputs conditions, including the document format, the image density, a switching signal, etc., which determines whether or not shading removal is to be conducted. The shading removal processing region decision section 1305, with the inputs as shown, specifies regions which satisfy the conditions of the shading removal processing condition input section 1302 and provides an output to the region separator 1306. The region separator 1306 separates the regions in accordance with the output of the shading removal processing region decision section 1305 and delivers outputs as indicated. The shading removal processor 1303 executes shading removal processing in the specified regions. The shaded image synthesizer 1307, which is an overlapping processing section, executes the logical OR of the outputs of the unspecified regions from the region separator 1306 and the specified regions wherein shading removal was conducted according to the output of the shading removal processor 1303. The output of the shaded image synthesizer 1307 is delivered to the shaded synthetic image output section 1304.

In accordance with the present invention, the shading removal processing and the like are conducted by document image processing elements in the system, including the document filing system explained above, and thus can be used for expunging image data from figures that include shading, for recognition of characters in photographs printed by screen process printing, and in general for a wide range of other applications.

Moreover, since the present invention provides deshaded output images, these images can be used in ordinary image processing without modification, even in the case where the image input device is a CCD scanner, an image scanner, or the like having a shading removal processor. Making the shading removal processor an LSI or the like also enhances its utility as an image input device.

The present invention can be used for high efficiency compression encoding, and for storage, transmission, transfer and the like of document images with shading. The shading can be regenerated at the time of display, reception, print out, or the like, so that the original document can be faithfully reproduced or reproduced in a synthetic form.

The present invention is able to recognize characters entered or printed over non-dropout color shading, which has been difficult to achieve prior to the present invention.

We claim:

1. A document image processing system, comprising:
    means for photoelectrically dither processing, by binarizing error diffusion, a multivalue document image having a shading background to obtain a binary dither processed image in which image density is expressed in terms of horizontal line width and density;
    means for reconstructing multivalue image data from the binary dither processed image to obtain reconstructed multivalue image data;
    means for removing a shading background from the reconstructed multivalue image data to produce deshaded reconstructed binary image data; and
    means for compression encoding the deshaded reconstructed binary image data.

2. The system of claim 1, wherein the shading background is overlaid with information that is distinguishable from the shading background.

3. A document image processing method, comprising the steps of:
    removing a shading background from a document by
        (a) density restoring, by spatial filtering, a binary document image to obtain a multivalue document image,
        (b) binarizing the multivalue document image to obtain a first binary image,
        (c) edge detecting, in the horizontal and vertical directions, the binary document image to obtain multivalue detected images, respectively,
        (d) binarizing the multivalue detected images respectively to obtain second and third binary images, respectively,
        (e) logically ORing the first binary image, the second binary image and the third binary image to obtain a fourth binary image,
        (f) thickening the fourth binary image to obtain a fifth binary image, and
        (g) logically ANDing the binary document image and the fifth binary image to obtain a deshaded image.

4. The system of claim 2, wherein the shading background is overlaid with information that is distinguishable from the shading background.

* * * * *